US 9,758,184 B1
Sep. 12, 2017

United States Patent
Vaverek

(54) THREE WHEEL CARGO CART WITH LIFTING DRAWBAR

(71) Applicant: Milton Vaverek, San Marcos, TX (US)

(72) Inventor: Milton Vaverek, San Marcos, TX (US)

( * ) Notice: Subject to any disclaimer, the term of this patent is extended or adjusted under 35 U.S.C. 154(b) by 0 days.

(21) Appl. No.: 15/063,232

(22) Filed: Mar. 7, 2016

Related U.S. Application Data

(60) Provisional application No. 62/179,000, filed on Apr. 21, 2015.

(51) Int. Cl.
  *B62B 1/04* (2006.01)
  *B62B 1/20* (2006.01)
  *B62B 1/00* (2006.01)
  *B62B 1/18* (2006.01)
  *B62B 5/06* (2006.01)

(52) U.S. Cl.
  CPC ............... *B62B 1/20* (2013.01); *B62B 1/002* (2013.01); *B62B 1/008* (2013.01); *B62B 1/186* (2013.01); *B62B 5/06* (2013.01)

(58) Field of Classification Search
  CPC .. B62B 1/20; B62B 1/22; B62B 1/002; B62B 1/008; B62B 1/186
  See application file for complete search history.

(56) References Cited

U.S. PATENT DOCUMENTS

| RE9,283 E | * | 7/1880 | Woodruff | 280/35 |
| 2,003,162 A | * | 5/1935 | Donald | B62B 3/02 280/35 |
| 2,469,242 A | * | 5/1949 | Pohl | B62B 3/02 280/651 |
| 2,534,367 A | * | 12/1950 | Perrotta | A45C 13/385 211/49.1 |
| 3,236,539 A | * | 2/1966 | Ketterer | B62B 3/007 16/113.1 |
| 3,411,798 A | * | 11/1968 | Capadalis | B62B 1/002 16/30 |
| 4,796,909 A | * | 1/1989 | Kirkendall | B62B 3/02 180/906 |
| 5,249,823 A | * | 10/1993 | McCoy | B62B 3/02 280/144 |
| 5,465,996 A | * | 11/1995 | Wisz | A45C 13/385 280/35 |
| 5,599,031 A | * | 2/1997 | Hodges | B62B 5/0083 280/35 |

(Continued)

*Primary Examiner* — J. Allen Shriver, II
*Assistant Examiner* — Steve Clemmons
(74) *Attorney, Agent, or Firm* — Rick B Yeager

(57) ABSTRACT

A three wheel cart that is adjustable in both length and width for cargo such as ice chests. The cart provides a pair of rear wheels, a horizontal load platform, and a front drawbar with a third wheel for easy pulling or pushing. The drawbar and third wheel retract under the cart. All adjustments are made without wrenches utilizing a large soft hand nut. The width adjustment is interconnected by a mechanism so that cargo width retainers slide in and out simultaneously along with the cart main wheels. When the drawbar is raised into its towing position the cart's front support leg is levered off the ground by the third wheel. This capability minimizes the lifting effort required when towing the cart. As the drawbar is lowered the support leg becomes an automatic parking brake. The operator cannot abandon the cart without the brake being applied.

11 Claims, 6 Drawing Sheets

(56) References Cited

U.S. PATENT DOCUMENTS

| | | | | |
|---|---|---|---|---|
| 6,328,319 B1* | 12/2001 | Stahler, Sr. | B62B 1/002 | 280/47.18 |
| 6,419,198 B1* | 7/2002 | Einav | A47B 91/005 | 248/346.03 |
| 6,419,244 B2* | 7/2002 | Meabon | B62B 1/002 | 280/47.17 |
| 6,536,796 B1* | 3/2003 | Solomon | B62B 3/02 | 280/47.34 |
| 6,783,147 B1* | 8/2004 | Green, Sr. | B62B 1/20 | 280/47.26 |
| 6,964,423 B1* | 11/2005 | Chieh | B62B 5/0083 | 248/129 |
| 7,175,188 B2* | 2/2007 | Joncourt | A45F 3/04 | 280/47.17 |
| 7,213,820 B2* | 5/2007 | Drummond | B60B 33/0005 | 280/47.34 |
| 7,762,566 B2* | 7/2010 | Wang | B62B 5/0083 | 280/651 |
| 8,684,372 B2* | 4/2014 | Buttazzoni | B62B 5/0083 | 280/35 |
| 8,944,442 B2* | 2/2015 | Tsai | B62B 3/02 | 280/35 |
| 8,950,760 B1* | 2/2015 | Davis | B62B 3/02 | 254/133 R |
| 9,010,770 B2* | 4/2015 | Cantrell | B62B 5/0083 | 280/35 |
| 9,067,611 B2* | 6/2015 | Grosse-Plankermann | B62B 3/16 | |
| 2003/0189303 A1* | 10/2003 | Ciminelli | B62B 1/002 | 280/47.34 |
| 2004/0173996 A1* | 9/2004 | Anderson | B62B 5/0083 | 280/651 |
| 2004/0232660 A1* | 11/2004 | Chen | B62B 3/02 | 280/651 |
| 2010/0156059 A1* | 6/2010 | Esser | B62B 1/002 | 280/47.2 |
| 2015/0360707 A1* | 12/2015 | Gullino | B62B 3/001 | 280/659 |

* cited by examiner

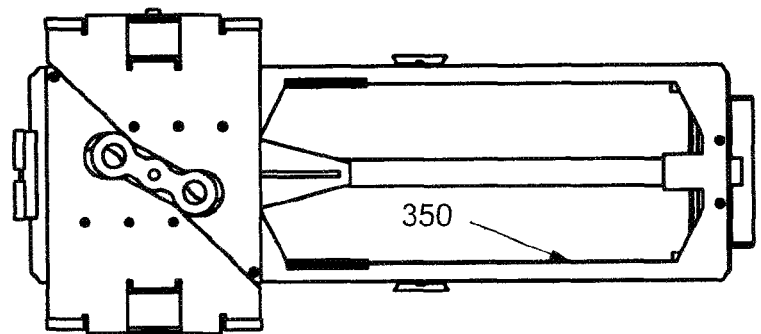
FIG 1 TOP VIEW
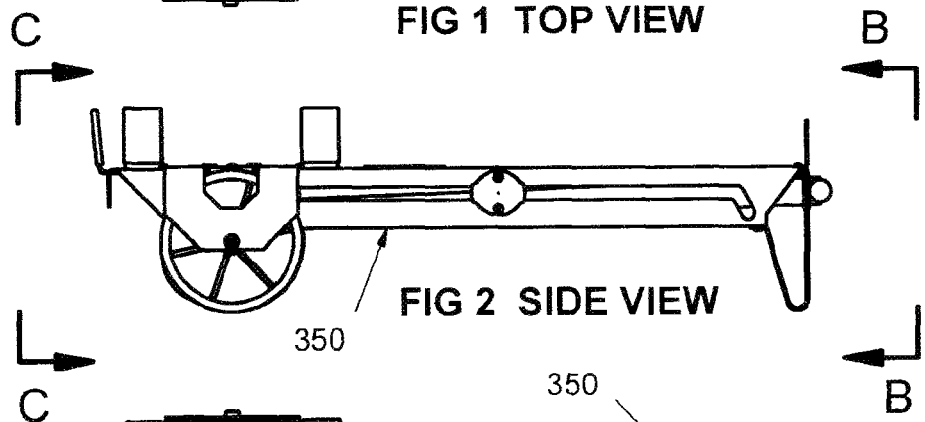
FIG 2 SIDE VIEW
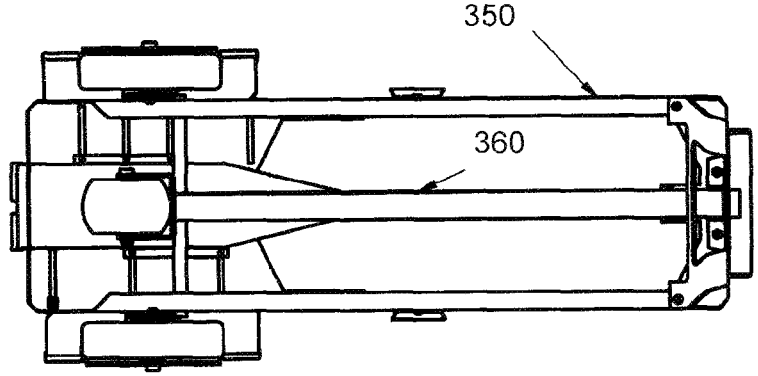
FIG 3 BOTTOM VIEW
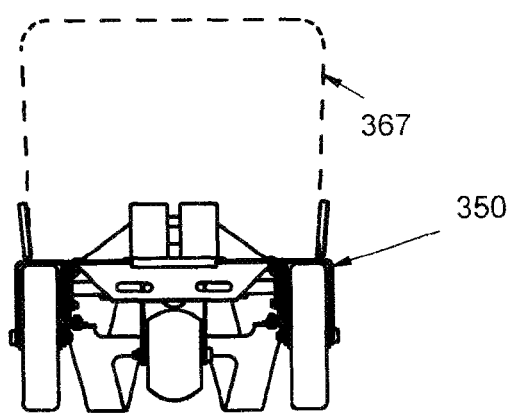
FIG 4 REAR VIEW "C"
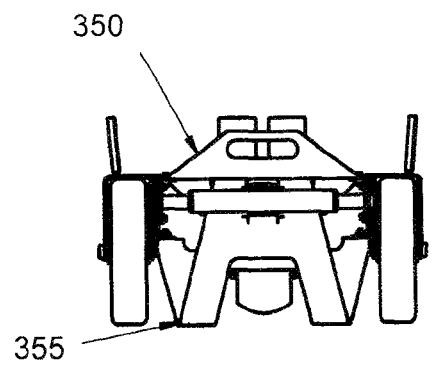
FIG 5 FRONT VIEW "B"

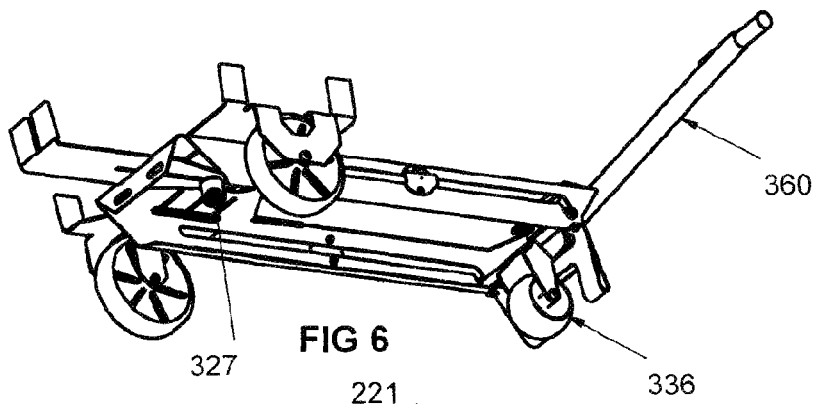
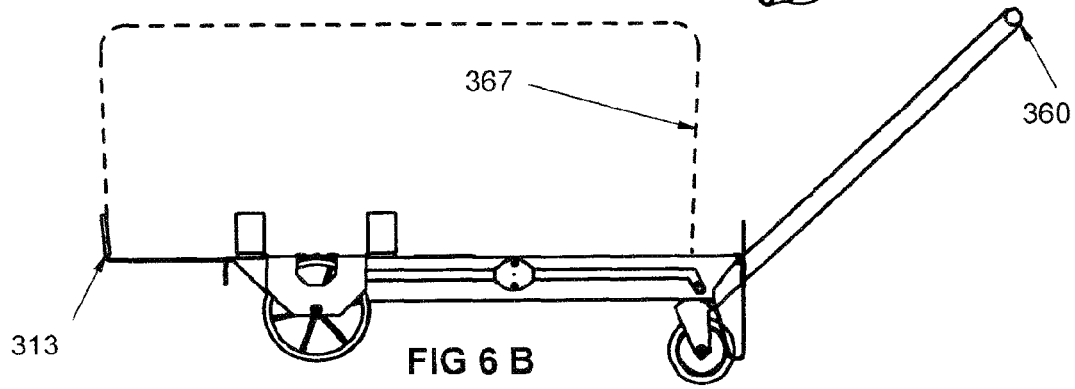
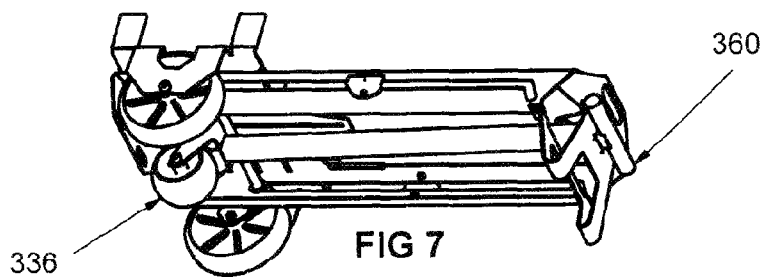

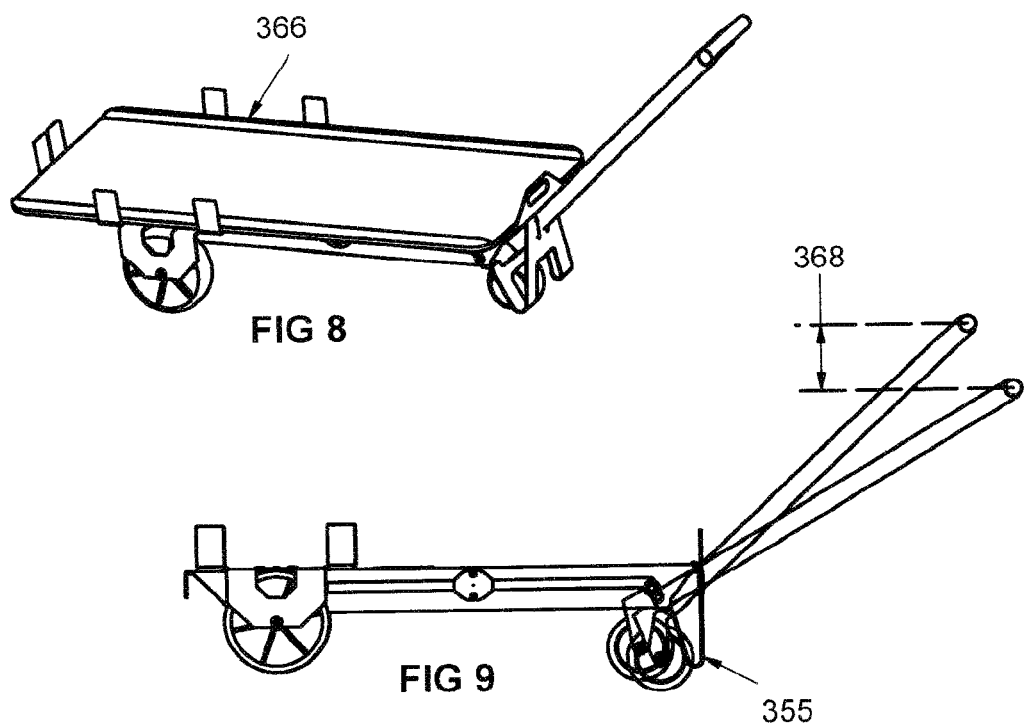
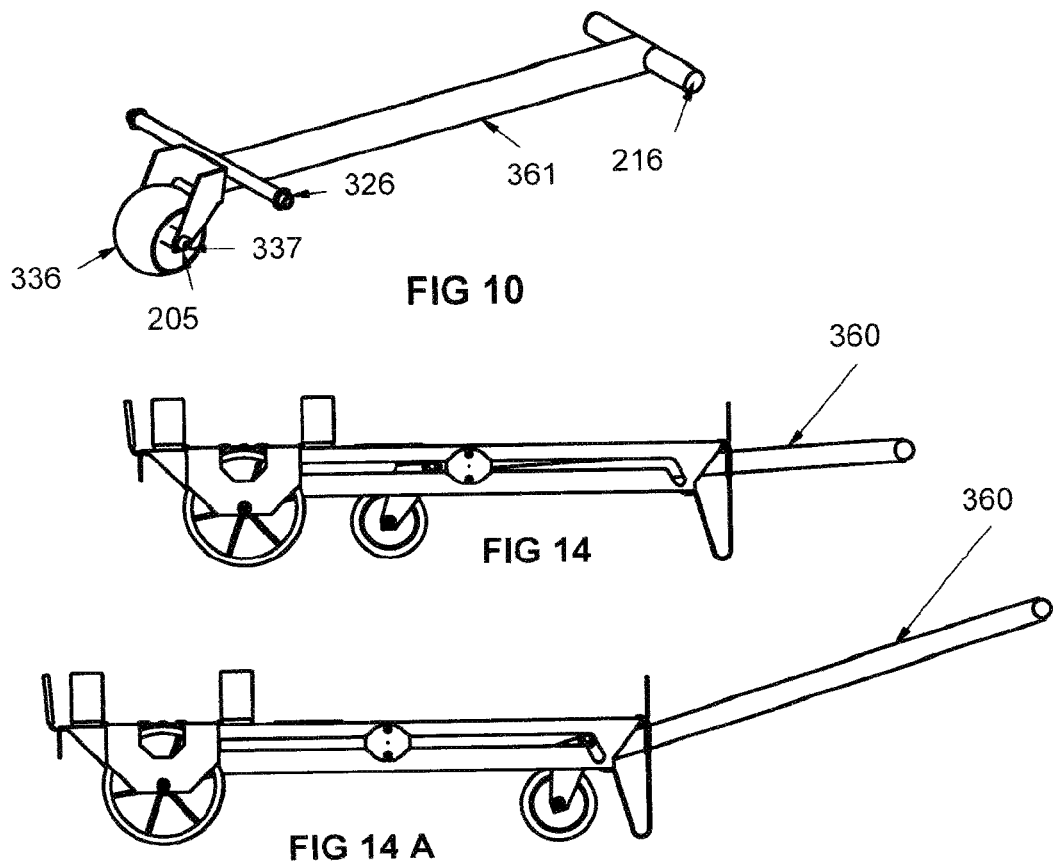

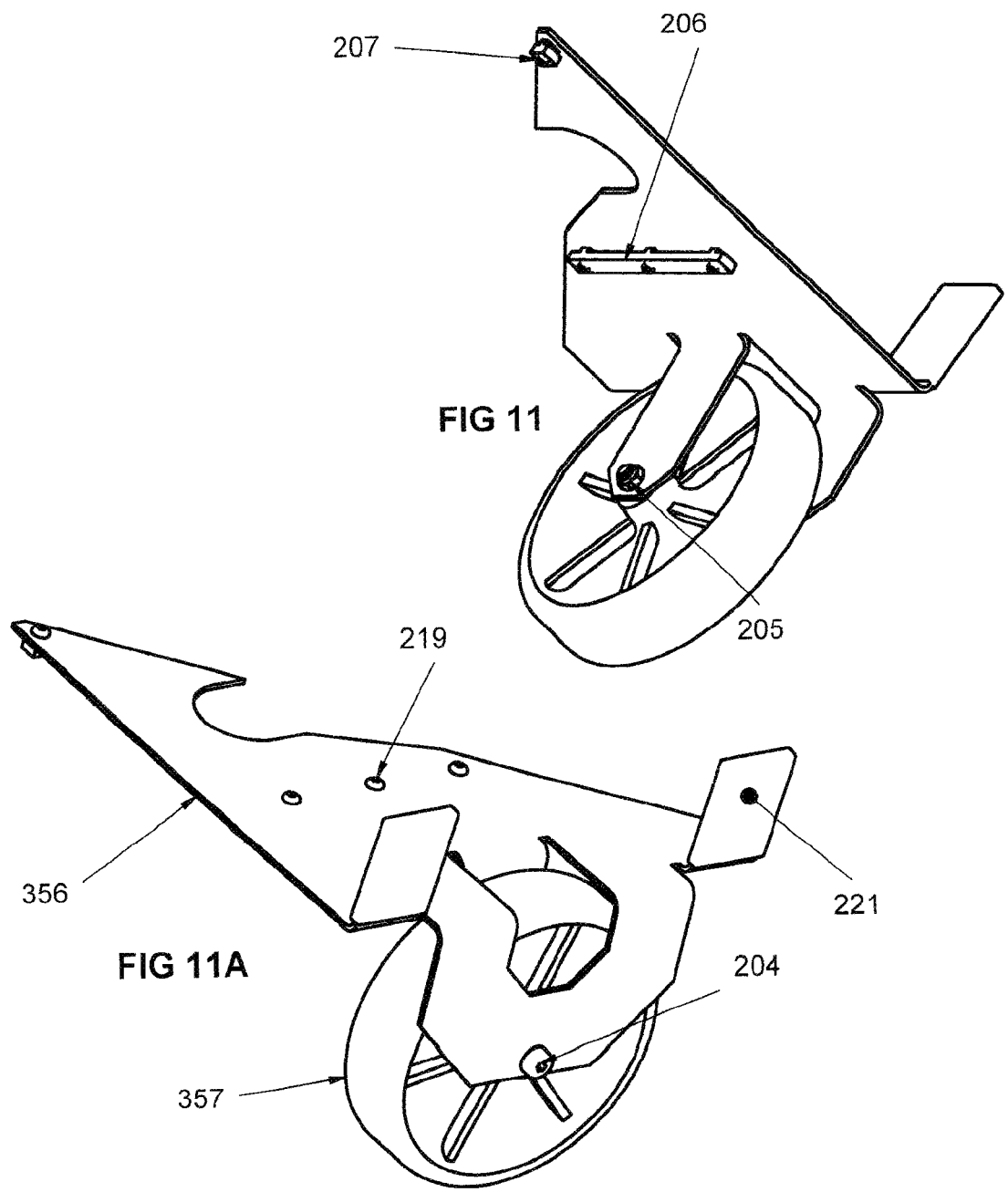

DETAIL D

THREE WHEEL CARGO CART WITH LIFTING DRAWBAR

RELATED APPLICATIONS

This non-provisional US patent application is related to US Provisional Application No. 62/179,000 filed Apr. 21, 2015, by applicant, and claims the priority of that filing date.

BACKGROUND

Field of the Invention

The present invention relates to a cargo cart, and more particularly to a three-wheeled cart with a lifting drawbar.

Prior Art

The prior art includes various devices adapted to carrying coolers.

U.S. Pat. No. 4,873,841 to William Bradshaw for a portable cooler describes a two wheel device where the wheels are an integral part of the cooler. The wheels extend beyond the width of the cooler. In one embodiment of the current invention, maneuverability is improved by providing adjustable rear wheels so they are always positioned within the silhouette of the cargo. The drawbar design, of the current invention, also improves maneuverability when the unit is pushed backward through confined spaces.

U.S. Pat. No. 5,169,164 to Michael A Bradford Cooler Tote cart does not have a front support leg thus when the operator releases the handle the front of the cooler drops to the ground. The cooler must then be unstrapped and removed from the wheels prior to removing goods from within. In one embodiment of the current invention, the cargo need not be strapped to the card thus the cargo always remains horizontal and can be accessed without the cooler being removed from the cart.

U.S. Pat. No. 5,249,823 to Stephen T. McCoy and Jack G. Clark Jr. describes a size variable cart which is adjustable in length and width using five separate mechanical functions. In one embodiment of the current invention, length and width adjustment requires using only one mechanical function. The loosening of one hand nut releases both length and width, thereby allowing both features to be adjusted simultaneously. Retightening said hand nut securely locks both the length and width in place. The '823 device unit does not provide a rear cargo stop and it requires straps to contain the cargo. In one embodiment of the current invention, vertical posts are provided in both the length and width directions to secure the cargo without straps. The '823 device provides wheel arrangement similar to a four wheeled wagon. In one embodiment of the current invention, a single retractable centrally located front wheel or caster is attached to a drawbar so that the front wheel engages the ground as the drawbar is elevated releasing the cart's anchor leg. When the drawbar is released the cart front leg automatically contacts the ground, thereby anchoring the vehicle.

Most of the prior art for providing wheeled transport for coolers have wheels that are permanently attached to the cooler, or the cooler must be specifically constructed to be attached to the wheeling device. The devices for providing wheeled portability to luggage do not address the problem of maintaining horizontal stability so as to prevent the cooler from slipping off the cart and/or spilling the contents. These deficiencies are especially severe in view of the existing large number of heavy coolers made without wheeled transport means.

SUMMARY

In one embodiment of the current invention, an adjustable cart is provided that can be used with a wide variety of existing coolers without modification of the cooler. The cart is lightweight, provides stability to the cooler when wheeled, and allows the cooler to be easily accessed without removing it from the cart or undoing retention straps.

In one embodiment, both length and width are adjustable using only one soft nut (¼-20 nut with rubber coating) that is about 1-½ inch in diameter. It provides more clamping power and is more comfortable to use than a wing nut. The cart has two main wheels and a third wheel that is attached to the drawbar. As the drawbar is raised the third wheel is levered into position and carries most of the load normally born by the operator. When the drawbar is released, a front cart support leg contacts the ground and automatically functions as a parking break.

BRIEF DESCRIPTION OF THE DRAWINGS

FIG. 1 is a top view of an embodiment of a cart. A three wheeled complete cart assembly 350 has cargo retaining members in the retracted position.

FIG. 2 is a side view of the cart of FIG. 1.

FIG. 3 is a bottom view of a cart of FIG. 1 with the drawbar 360 nested within the cart frame.

FIG. 4 is a rear view of the cart of FIG. 1 with an outline of the cargo 367 which shows that the wheels are located under the cargo rather than outboard.

FIG. 5 is a front view of the cart of FIG. 1 illustrating the cart 350 and the front support leg 355.

FIG. 6 is a bottom perspective of the cart of FIG. 1 with the drawbar 360 extended, the third wheel 336 in its towing position and the adjustment clamping hand nut 327.

FIG. 6A is a top perspective of the cart of FIG. 1 illustrating the maximum expanded width and length of the cargo retaining support posts 221, the front support leg 355 and sub-assemblies of the wheel and its support frame 351.

FIG. 6B shows the outline of a cargo box 367 with the rear retaining post 313 at maximum extension and the extended drawbar 360.

FIG. 7 is a bottom perspective of the cart of FIG. 1 with the drawbar 360 and third wheel 336 retracted.

FIG. 8 illustrates an optional tray 366 which facilitates alternate uses of the cart.

FIG. 9 Illustrates that three wheeled operation is obtained at a variety of handle heights. The drawbar elevation height range (about 8 inches) is comfortable for users of various statures. Lowering the handle below this range anchors the cart when the solid front leg 355 contacts the ground.

FIG. 10 is a top perspective view of the cart drawbar sub-assembly 360, its welded sub-assembly 361, wheel 336, axle 337, nut 205, handle plugs 216 and slide bushings 326.

FIG. 11 is a bottom perspective view of the wheel sub-assembly 351 including the frame slide anchor bar 206 and special slide nut 207 and axle nut 205.

FIG. 11A is a top perspective view of the cart support frame and wheel sub-assembly 351 including support frame 356, axle 204, cargo retaining boot 221, screw 219 and wheel 357.

FIG. 12A is a bottom rear perspective view of the cart frame sub-assembly 352 including the wheel sub-assemblies 351, main frame 310, cam bar 325, cam bar clamp bolt 323, hand edge strip 208, rear cargo stop 313 and retention boot 221.

FIG. 13A is an enlarged view of a portion of FIG. 13 to highlight the edge cushions 330 that cushions the drawbar as it slides in and out, drawbar retaining pad 331, screw 219 and nut 220.

FIGS. 14 & 14A illustrates the movement of the drawbar assembly 360 from its stowed position to its fully forward position just prior to elevating the handle. As the handle is elevated in FIG. 9, the third wheel contacts the ground thus providing for three wheel cart operation.

Figure 12:
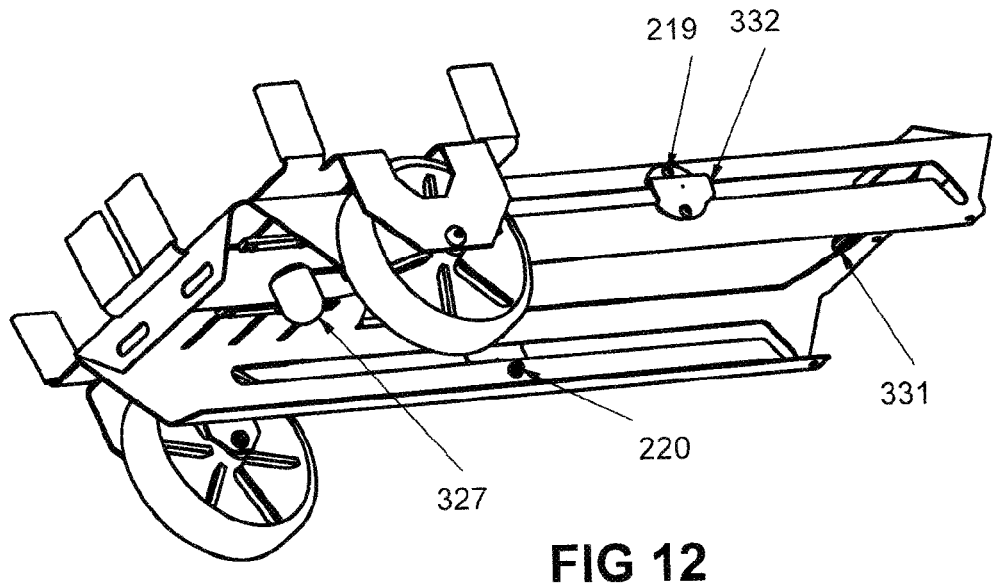
FIG. 12 bottom perspective view of the wheels and main cart frame sub-assembly 352 including the frame slot tie bracket 332, screw 219, nut 220, adjustment clamp hand nut 327 and drawbar retaining pad 331.
Figure 12:
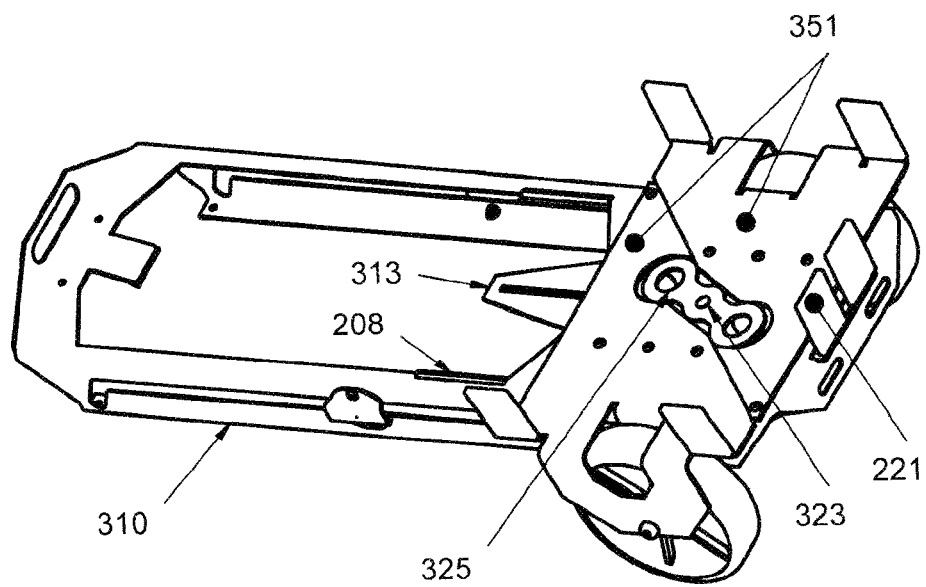

DESCRIPTION OF EMBODIMENT three wheel cart with lifting drawbar The following list of elements is provided for reviewing FIGS.
1-14A Cargo outline 367
three wheel cart 350
  front support leg 355
  screw 219
  lock nut 220
  edging strip 330
  main frame sub-assembly 352
    rear wheel sub-assembly
      rear wheel 357
      axle 204
      axle lock nut 205
      structural frame 356
      frame sliding clamp bar 206
      frame sliding clamp nut 207
      bolts 219
      cargo protection sleeves 221
  main cart frame 310
    cam bar 325
    adjustment anchor bolt 323
    soft hand nut 327
    adjustable rear stop bar 313
    hand protection carry strip 208
    cargo retaining boot 221
    slot tie cap 332
    screw 219
    lock nut 220
    drawbar damper 331
  drawbar sub-assembly 360
    handle end plug 216
    flange bushing 326
    third wheel element 336 or caster (not shown) axle 337
    lock nut 205
    drawbar weldment 361
      main tube 364
      handle cross tube 213
      wheel support bracket 362
      slide bar 363
Cart Final Assembly 350

Figure 13:
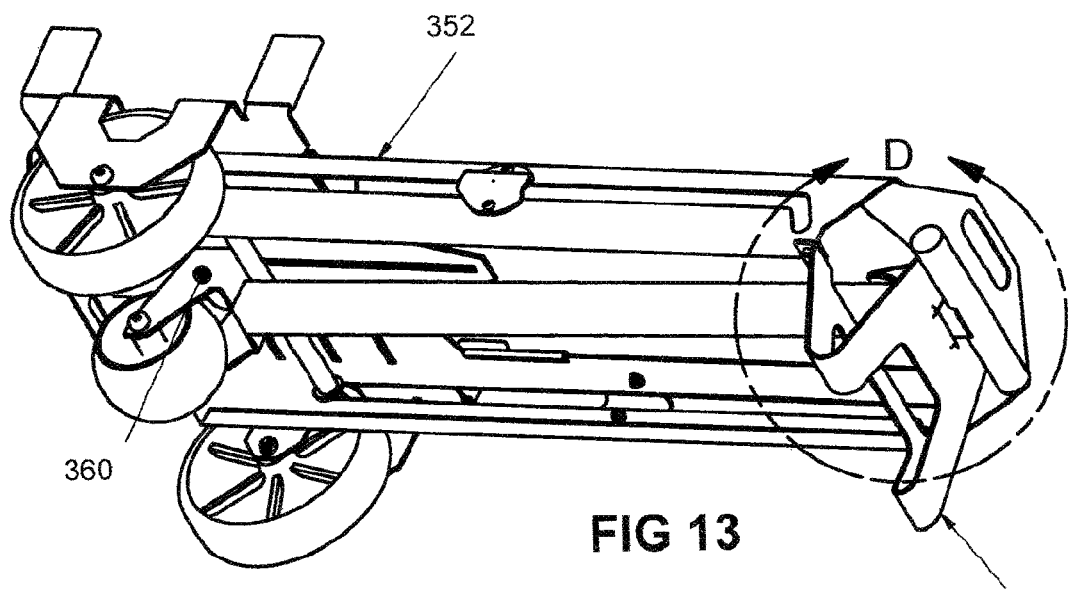
FIG. 13 is a bottom perspective view with the drawbar fully retracted (stowed) 360, the frame sub-assembly 352 and support leg 355.
Figure 13:
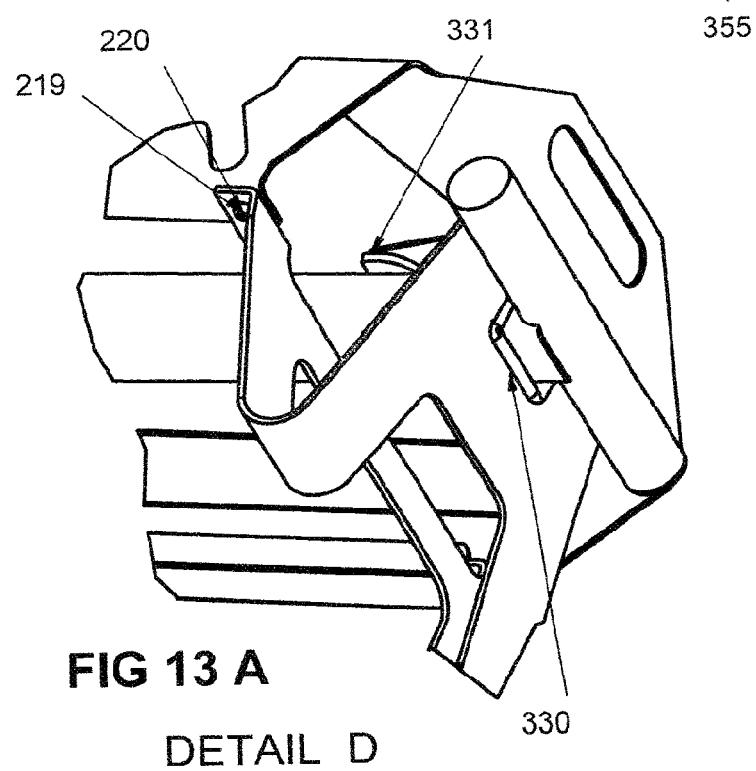

FIG. 13 is a perspective of 350 the cart final assembly with the drawbar assembly 360, mam frame sub-assembly 352, front support leg 355, guide sleeves 330, leg bolt 219 and lock nut 220.

Main Frame Sub-Assembly 352

FIGS. 12 & 12A are perspectives of 352 the main frame sub-assemble with the main cart frame 310, wheel sub-assemblies 351, cam bar 325, which makes the width adjustment even, adjustment anchor bolt 323, soft nut 327 that anchors all the adjustments, cart adjustable rear stop bar 313, hand protection strip 208 for carrying the empty cart, cargo protection sleeves 221, drawbar slide damper cushion 331, slot tie bar 332, tie bar bolt 219 and lock nut 220.

Wheel Sub-Assembly 351

FIGS. 11 & 11A are perspectives of 351 the wheel assembly with the structural frame 356, main wheel 357, frame sliding clamp bar 206, special frame sliding clamp nut 207, bolts 219 to clamp the bar and nut, cargo protection sleeves 221, axle 204 and axle lock nut 205.

As shown in FIG. 6A, the rear top surface of the main cart frame 310 has a plate interconnecting the two longitudinally running side rails. This center plate includes a plurality of laterally oriented guide slots that cooperate with the vertical portions of frame sliding clamp bar 206 and the frame sliding clamp nut 207 to constrain the movement of the two rear wheel sub-assemblies 351 to the lateral direction.

In this embodiment, the width adjustment feature is based on the interaction of the centrally located cam bar 325. The cam bar has a "dumbbell" shape with an elongated body that terminates at both ends at an enlarged circular head. The cam body 325 is pivotally mounted at its center to the center plate of the main cart frame 310. The two rear wheel sub-assemblies 351 each have a generally triangular plate with an angled interior edge having a circular recess which receives the circular head of the clamp bar 325. The two sub-assemblies are arranged such that the circular recesses each constrain the clamp bar 325 such that when the clamp bar is rotated about its center the two sub-assemblies 351 translate simultaneously in the width direction. Similarly, counter-rotation of the cam bar 325 causes the two sub-assemblies 351 to move together. The slot-captured clamp bars 206 and clamp nut 207 restrict the movement of the sub-assemblies 351 to the lateral direction. The adjustment anchor bolt 323 is fixedly mounted to the cam bar 325 and rotates therewith (otherwise the single fastener 327 could not restrict the movement of both the width and length adjustment).

The rear stop bar 313 has an elongated flat plate that extends longitudinally along the center of the cart frame 310. The rearward end of the longitudinal plate has the rear protection sleeve 221 depending upwardly therefrom. An elongated slot in the longitudinal plate receives the adjustment anchor bolt 323. The rear stop bar 313 is mounted below the main cart frame's center plate and receives the anchor bolt 323 that passes down through an aperture in the center plate. When the soft hand nut 327 is loosened, the overlapping layers of rear stop bar 313, main cart frame center plate, and cam bar 325 are freed to allow for adjustment. That is, the cam bar 325 is freed to rotate upon the center plate, while the rear stop bar may slide longitudinally beneath the center plate along its longitudinal slot. The tightening and loosening of this single hand nut 327 enables a user to adjust the width and length of cart's platform.

Drawbar Assembly 360

FIG. 10 is a perspective of 360 the drawbar assembly with the drawbar weldment 361, are plugs 216 to cap both ends of the hollow handle, flanged bushings 326 that roll as the drawbar is slid in and out from its stowed position, third wheel 336 that retracts and extends with the drawbar, axle 337 for the third wheel and lock nut 205.

Definitions

In describing the embodiments of the invention specific terminology is resorted to for the sake of clarity; however, it is not intended that the invention be limited to the specific terms so selected and it is to be understood that each specific term includes all technical equivalents that operate in a similar manner to accomplish a similar purpose.

The terms "coolers", "ice chest" and "cargo" are used interchangeably.

The term "cam action" includes rack & pinion, scissor action and other mechanisms.

Advantages

Most of the prior art for providing wheeled transport for coolers have wheels that are permanently attached to the cooler or the cooler must be specifically constructed to be attached to the wheeling device. The devices for providing wheeled portability to luggage do not address the problem of maintaining horizontal stability so as to prevent the cooler from slipping off the cart and/or spilling the contents. These deficiencies are especially severe in view of the existing large number of heavy coolers made without wheeled transport means. The embodiment solve these problems by providing an adjustable cart that can be used with a wide variety of existing coolers without modification of the cooler. It is lightweight, provides stability to the cooler when wheeled, and allows the cooler to be easily accessed without removing it from the cart or undoing retention straps.

The cart is easily adjustable in length and width to accommodate various size ice chests and similar cargo.

The cart retains and secures the cargo without requiring tie-down straps. For best maneuverability the cart width does not exceed the cargo width. A solid drawbar provides comfortable towing and/or pushing of the cart.

A third wheel or caster supports the front of the cart when the drawbar is elevated.

When the drawbar is lowered the cart front support leg automatically anchors the unit. The third wheel or caster retracts with the drawbar, out of the way, when not in use.

Large diameter wheels provide easy and stable towing or pushing of the cart.

The empty cart, with drawbar retracted, is lightweight and easy to carry.

The cargo weight is transferred directly onto the wheel support frame.

Materials are corrosion resistant aluminum and stainless steel.

The cart size adjustments are accomplished with only one clamp nut. One soft hand nut accomplishes this task and no wrenches or loose parts required.

Opening the ice chest does not require undoing retention straps.

If the operator falls or for any reason released the handle the cart automatically stops.

Method of Use

This cart is intended primarily for use transporting large ice chest of various sizes that are heavy.

However it is equally suited, with the addition of an optional support tray, to transport all other materials that require horizontal based transport. The unit has vertical supports that entrap the cargo and hold it in position and it enables the operator to retrieve articles from therein without removing straps. Strap anchor points are available should the unit be used on extremely irregular terrain or with unstable cargo. The pulling device (drawbar) is easily pulled out, from its stowed position within the carts frame. When drawbar is elevated to a comfortable towing height it automatically lifts the cart anchor leg off the ground. The operator cannot abandon the cart without the solid leg acting as an automatic parking break.

It is to be understood that the specific embodiments and examples described above/below are by way of illustration, and not limitation. Various modifications may be made by one of ordinary skill, and the scope of the invention is as defined in the appended claims.

What is claimed is:

1. A cart comprising
a horizontally-oriented frame comprising an adjustable-width and adjustable-length cargo support platform comprising
a single cam adjustment element configured to adjust the width of the platform;
a pair of rear wheels;
a stationary front leg;
a retractable drawbar assembly having a distal end and a proximal end, the drawbar comprising
a third wheel element mounted on the proximal end, and a handle on the distal end,
such that the drawbar being extendable from a retracted orientation where the drawbar is stored substantially under the frame and the cart rests on the rear wheels and stationary front leg, to an extended orientation where the drawbar is raised and the cart may be pulled or pushed on the rear wheels and the third wheel element.

2. The cart of claim 1 wherein
the pair of rear wheels are provided on
a first rear wheel subassembly comprising a first horizontal plate and a first rear wheel, and
a second rear wheel subassembly comprising a second horizontal plate and a second rear wheel; and
the cam adjustment element further comprises a single soft hand nut or wing nut, such that loosening the soft hand nut or wing nut permits the cam adjustment element to be turned
in a first direction to separate the first and second horizontal plates, thereby increasing a spacing between the first rear wheel and the second rear wheel, and
in a direction opposite the first direction to bring the first and second horizontal plates closer together, thereby decreasing the spacing between the first rear wheel and the second rear wheel.

3. The cart of claim 1 wherein
vertical posts are provided in both the length and width directions to secure the cargo without straps.

4. The cart of claim 3 further comprising
a vertical post at the rear of the cart length and two vertical posts on each side of the cart.

5. The cart of claim 1 wherein
each of the pair of rear wheels is supported by a rear wheel assembly comprising slide nuts that attach the wheel assembly to the frame, such that the rear wheel positions are adjustable outwardly or inwardly as the cart width is adjusted.

6. The cart of claim 1 further comprising
a ridged tray configured to fit on the frame.

7. The cart of claim 1 further comprising
bushings at the proximal end of the drawbar.

8. The cart of claim 1 further comprising
an edging strip configured to serve as a carrying handle.

9. The cart of claim 1 wherein
the third wheel element is a caster.

10. A method of operating a three wheel cart, the method comprising
providing a cart comprising
a frame comprising a cargo support platform,
a pair of rear wheels,
a stationary front leg, and
a retractable drawbar assembly comprising a single third wheel element mounted on the proximal end, such that as the drawbar is extended forward from a stowed position under the frame and lifted, the drawbar forces the third wheel element down and pries the cart above the stationary front leg to permit three wheeled operation;

pulling or pushing the cart with the drawbar in a partially elevated position; lowering the distal end of the drawbar, thereby raising the third wheel; and resting the cart on the rear wheels and stationary front leg;

adjusting the width of the platform by operating a single cam adjustment mechanism;

sliding a rear cargo protection sleeve to a desired position in order to adjust the length of the platform; and tightening a hand nut or wing nut, to secure both the cam adjustment element and the position of the rear cargo protection sleeve.

11. The cart of claim 10 wherein
the pair of rear wheels are each attached to portions of the cargo support platform so that as the cargo support platform width is adjusted, the distance between the pair of rear wheels is adjusted.

* * * * *